E. H. Babcock.

Drill Chuck.

Nº 78,916.    Patented Jun. 16, 1868.

Witnesses:
W. C. Ashkettle
J. A. Service

Inventor:
E. H. Babcock
per Munn &
attorneys

United States Patent Office.

ELI H. BABCOCK, OF CANANDAIGUA, NEW YORK.

Letters Patent No. 78,916, dated June 16, 1868.

IMPROVED DRILL-CHUCK.

*The Schedule referred to in these Letters Patent and making part of the same.*

TO ALL WHOM IT MAY CONCERN:

Be it known that I, ELI H. BABCOCK, of Canandaigua, in the county of Ontario, and State of New York, have invented a new and improved Drill-Chuck; and I do hereby declare that the following is a full, clear, and exact description thereof, which will enable those skilled in the art to make and use the same, reference being had to the accompanying drawings, forming part of this specification.

This invention relates to an improvement in the method of holding and truing steel drills in lathes and drilling-machines, whereby machine-work is greatly facilitated, and whereby the process of drilling in iron, steel, or other metals can be much more accurately performed than when done by drills held in the ordinary manner.

And the invention consists in securing the drill in an elastic conical jaw, with a screw-thread thereon, and a conical nut which engages therewith, and also in an elastic reducer, whereby drills of smaller size may be firmly and accurately centred and held while in use, as will be hereinafter more fully described.

Similar letters of reference indicate corresponding parts.

Figure 1:
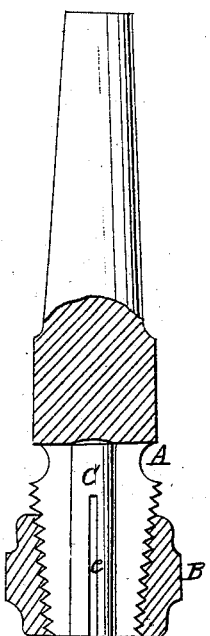
Figure 1 is a longitudinal sectional view of the chuck and drill, with the reducer in the chuck, the section being through the line $x\ x$ of fig. 2.
Figure 2:
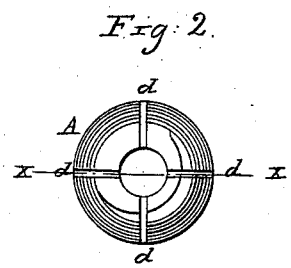
Figure 2 is a cross-section of the chuck with the nut off.
Figure 4:
Figure 4 is a view of a drill prepared for the chuck.
Figure 3:
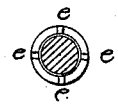
Figure 3 shows the outer end of the reducer, as seen from the line $y\ y$.

A represents the chuck, which is slit from its outer end to near the base of the cone, rendering thereby the outer end compressible or elastic, so that it is made to firmly embrace the shank of the drill, or the reducer, upon application of the nut.

B is the nut, which is made conical within to fit the chuck, as seen in the drawing.

C is the reducer, which is made to fit the chuck the same as the shank of the larger drill, and it also is slit so that its sides and outer end are elastic or compressible for embracing the shank of the smaller drill, upon the application of the nut B.

$d$ represents the slits in the chuck B, and $e$ the slits in the reducer C.

There may be more or less of these slits in either the chuck or reducer.

It will be seen that as the chuck, reducer, and drills are fitted to a common centre, the application or effect of the conical nut will be to true the drills accurately to that centre, and to hold them there while being used.

The nut is readily removed or screwed on by means of a wrench.

When unscrewed or loosened, the elastic sides of the chuck or reducer will allow the drill to be easily removed.

By this method of fastening, the drills will always be true to the centre, and ready for use, while the operator will be enabled to perform his work in a much more perfect and workmanlike manner than he could with drills secured to the mandrel in the ordinary manner.

Having thus described my invention, I claim as new, and desire to secure by Letters Patent—

In combination with the chuck A, the nut B and the reducer C, substantially as and for the purpose described.

ELI H. BABCOCK.

Witnesses:
  JOHN S. McCLURE,
  JOHN STANDISH.